United States Patent [19]

Moore

[11] 4,318,679

[45] Mar. 9, 1982

[54] APPARATUS FOR CASTING TOILET TANKS

[75] Inventor: Bernard C. Moore, Ohain, Belgium

[73] Assignee: American Standard Inc., New York, N.Y.

[21] Appl. No.: 108,991

[22] Filed: Jan. 2, 1980

Related U.S. Application Data

[63] Continuation of Ser. No. 27,563, Apr. 6, 1979, abandoned.

[51] Int. Cl.³ .......................... B29C 1/00; B29C 1/06; B29C 5/10

[52] U.S. Cl. ................................ 425/348 S; 249/118; 249/119; 249/120; 249/121; 249/122; 249/126; 249/129; 249/134; 249/141; 249/142; 249/160; 249/162

[58] Field of Search .................. 264/86; 249/119, 120, 249/121, 122, 118, 126, 129, 160, 161, 162, 168, 169, 141, 142, 134; 425/346, 348 S

[56] References Cited

U.S. PATENT DOCUMENTS

| | | | |
|---|---|---|---|
| 1,691,899 | 11/1928 | Paley | 425/453 |
| 1,712,978 | 5/1929 | Brinkman | 264/86 |
| 2,583,842 | 1/1952 | Hendrickson . | |
| 2,983,983 | 5/1961 | Mayer | 249/168 |
| 3,360,231 | 12/1967 | Van Hezik | 249/169 |
| 3,397,259 | 8/1968 | Arnold et al. | 264/86 |
| 3,804,361 | 4/1974 | Camus | 249/161 |

FOREIGN PATENT DOCUMENTS

| | | |
|---|---|---|
| 2444551 | 4/1976 | Fed. Rep. of Germany . |
| 2210135 | 7/1974 | France . |
| 1140282 | 1/1969 | United Kingdom . |

*Primary Examiner*—Willard E. Hoag

*Attorney, Agent, or Firm*—James J. Salerno, Jr.; Robert G. Crooks

[57] ABSTRACT

An apparatus for casting toilet tanks from ceramic material in slip form is disclosed. A plurality of mold parts which include two side mold parts which when assembled define a casting cavity and a core part which is positioned in the mold cavity and is spaced from the mold surfaces of the two side parts to define the front back and side walls of the toilet tank. One of the side mold parts includes an integral base for forming the bottom wall of the tank. Each side mold part arranged in a general horizontal line and are shiftable longitudinally to open and close the mold unit.

9 Claims, 2 Drawing Figures

APPARATUS FOR CASTING TOILET TANKS

This is a continuation of application Ser. No. 027,563 filed Apr. 6, 1979, abandoned.

SUMMARY OF THE INVENTION

This invention relates to an installation or facility for casting from ceramic material in slip form, toilet tanks for water closet bowls.

According to the present invention there is provided an installation or facility for casting cistern or toilet tanks, comprising a plurality of mold units arranged in a generally horizontal line on a support structure, each mold unit comprising two side mold parts which can be assembled to define a casting cavity for casting a toilet tank, one side mold part having a substantially vertical cavity surface for forming the back wall of the tank and the other side mold part being substantially channel-shaped in plan and having substantially vertical cavity surfaces for forming the side walls and front wall of the tank, one of the side mold parts having an integral base for forming the bottom wall of the tank, the side mold parts being adapted to be opened and closed by relative movement in a direction longitudinally of the line of mold units, each side mold part being connected in back-to-back relation to the adjacent side mold part of the next adjacent mold unit in the line.

Such an installation achieves the benefits of mass production with bank casting of up to fifty or more mold units in a line, which has hitherto not been possible for casting toilet tanks.

For solid casting of toilet tanks, the base for forming the bottom wall of the tank, is preferably provided on the side mold part having the vertical cavity surface for forming the back wall of the tank. A core part is also provided which is adapted to be moved in a vertical direction into the side mold parts so as to be spaced between them.

For drain casting of toilet tanks, the base for forming the bottom wall of the tank is preferably provided on the side mold part which is channel-shaped in plan, and either a separate mold cover part is provided or the other side mold part has an integral cover part.

BRIEF DESCRIPTION OF THE DRAWINGS

The invention may be carried into practice in many ways but certain specific embodiments will now be described by way of example only with reference to the accompanying drawings, in which.

DESCRIPTION OF THE PREFERRED EMBODIMENTS

Figure 1:
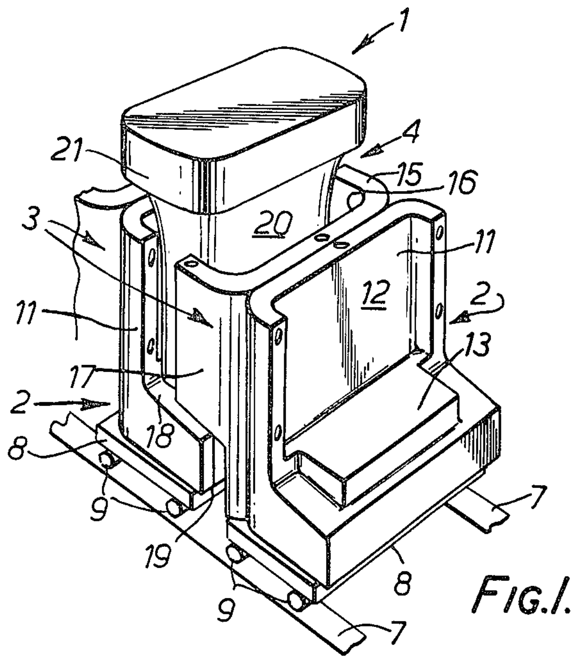
FIG. 1 is a perspective view of part of a line of mold units for solid casting of toilet tanks.
Figure 2:
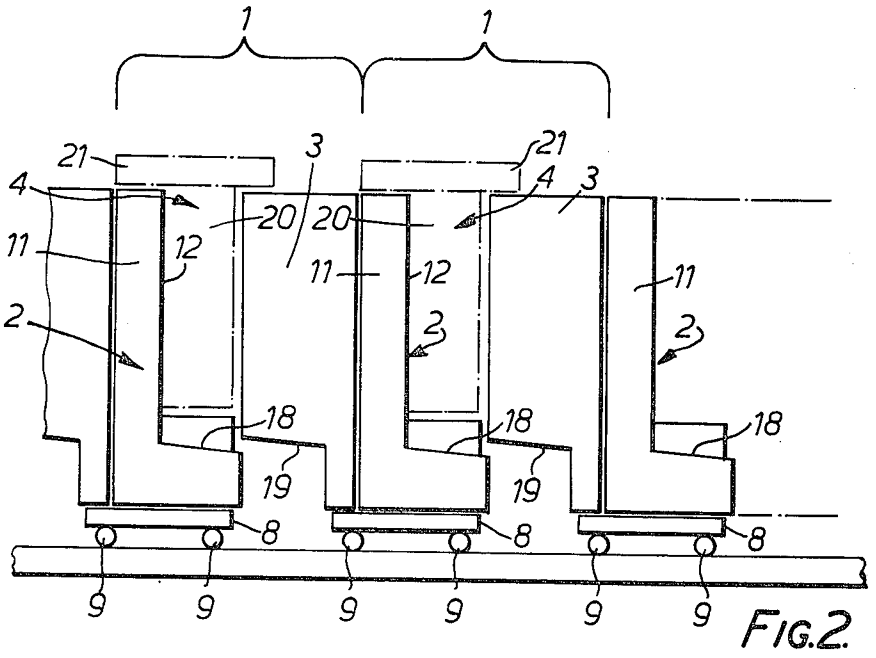
FIG. 2 is a side view of the line of FIG. 1.
Figure 3:
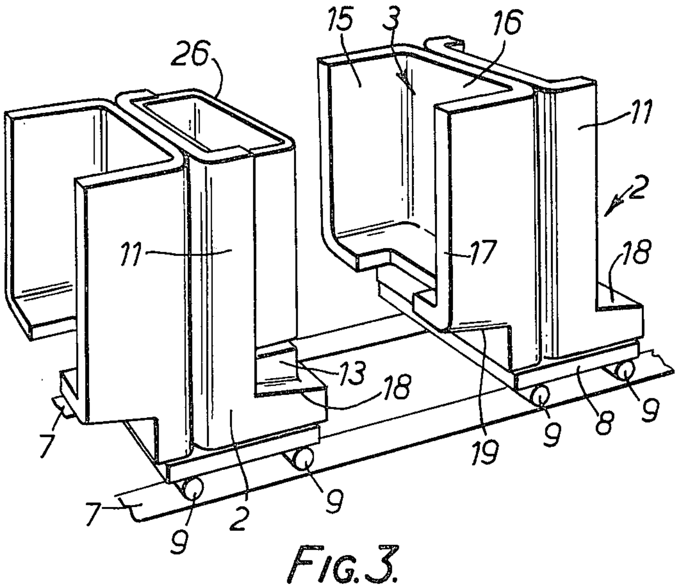
FIG. 3 is a further perspective view of the line of mold units of FIGS. 1 and 2 during emptying.

FIGS. 1 to 3 show an embodiment for solid casting of toilet tanks in a line or bank of fity or more mold units arranged in a horizontal line on a support structure in the form of two rails 7 extending longitudinally of the line.

Each mold unit 1 consists of three main mold parts: two side parts 2 and 3 and a core part 4. The side parts 2 and 3 are supported on carriers 8 fitted with rollers 9 so that they can be moved easily on the rails 7 in a longitudinal direction of the line. The side parts 2 each comprise an upstanding part 11 having a surface 12 which shapes the external surface of the back wall of the tank and a base part 13 which forms the bottom of the tank. The side parts 3 each comprise upstanding mold walls 15, 16 and 17 which form a channel shape as viewed in plan, the inside faces of which form the external surfaces of the side and front walls of the tank.

Each pair of side parts 2 and 3 of the same mold unit 1 can be brought together to define the casting cavity, the lower side edges 18 and 19 being inclined to the horizontal to allow the parts to be separated directly by movement in a horizontal direction without the mold parts scraping against each other.

In the line of mold units, each side part 2 is connected rigidly in back-to-back relation with the side part 3 of the next adjacent mold unit in the line.

The core part 4 for each mold unit comprises a core 20 depending from a rim 21 which when the mold unit is assembled rests on the upper edges of the side parts 2 and 3 which lie in a common plane. The core part 4 is adapted to be lifted vertically above the line during emptying, or lowered so that the core 20 is located between the side parts 2 and 3 in the assembled condition of each mold unit.

In operation, each mold unit 1 of the entire line are assembled by closing up the side parts 2 and 3 and lowering the core parts 4. The line of mold units 1 is then clamped longitudinally by an overall clamping arrangement at each end of the line, now shown. The core parts 4 may be held by clamping or other hold-down means, which may be common to all of the mold units, or the core parts 4 may be sufficiently heavy and simply rest on the side parts 2 and 3 without risk of the core moving when each mold unit is filled with slip under pressure.

The mold units 1 are then filled with slip, the slip flowing from a slip supply tank under gravity into the casting cavity in each mold unit 1.

After a suitable casting time has elapsed, during which time moisture is absorbed by the plaster of the molds, the molds are opened. The emptying procedure is as follows: core part 4 of the first mold unit of the line is lifted by a suitable lifting means which is capable of traversing the entire line of mold units.

The overall clamping of the side parts is then released and dealing with each mold unit in turn, the side parts are separated by moving side part 3 longitudinally along track 7 away from side part 2 on which the tank rests on the base part 13. The tank 26 (see FIG. 3) is then removed using suitable tongs or similar tools and placed on a rack at one side. The emptied side part 2 is then pulled along the track 7 in the direction of side part 3 which movement simultaneously pulls the side part 3 of the next mold unit to open that mold unit.

It will be appreciated that the particular design of the side parts 2 and 3 enables the toilet tanks to be cast in a line or bank casting installation and there are clear advantages in this.

Figure 4:
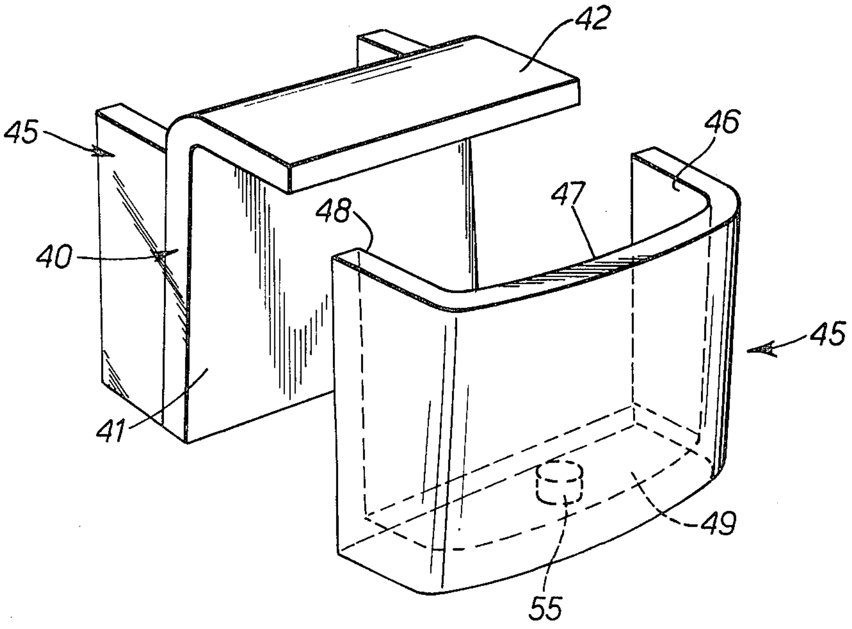
FIG. 4 is a perspective view of one of a line of mold units for drain casting a toilet tank.

FIG. 4 shows a mold unit for drain casting of toilet tanks. Only one mold unit is shown but a plurality of such mold units may be provided in a line, each side mold part being joined in back-to-back relation with the adjacent side mold part of the next mold unit, as in the example of FIGS. 1 to 3.

The mold unit comprises a first side mold part 40 having a substantially vertical cavity surface 41 for forming the back wall of the tank and an integral top wall for closing the top of the tank casting cavity, and a second side mold part 45 which is substantially channel-shaped in plan having substantially vertical cavity surfaces 46, 67 and 48 for forming the side walls and the front wall of the tank and an integral base 49 for forming the bottom wall of the tank.

For casting, the mold units are assembled and the cavities filled with slip under pressure. After allowing the appropriate casting time to elapse, a lower aperture 55 provided in the base 49 of each mold is opened and the surplus slip from the inside of the tank will drain out leaving the green drain-cast tanks in the molds. The mold units are then opened, in turn, by horizontal movement of the side parts along the line and each tank is removed from the respective mold part 45 and put to one side, this operation being repeated along the complete line of molds.

What is claimed:

1. Apparatus for casting toilet tanks for water closet bowls, comprising a plurality of mold units arranged in a generally horizontal line on a support structure, each mold unit comprising two side mold parts which are arranged and constructed to be assembled to define a casting cavity for casting a toilet tank, one side mold part being substantially channel-shaped in plan having a substantially vertical cavity surface for forming the back wall of the tank and the other side mold part being substantially channel-shaped in plan and having substantially vertical cavity surfaces for forming the side walls and front wall of the tank, one of the side mold parts having an integral base for forming the bottom wall of the tank, the side mold parts being adapted to be opened and closed by relative movement in a direction longitudinally of the line of mold units, each side mold part being connected in back-to-back relation to the adjacent side mold part of the next adjacent mold unit in the line.

2. Apparatus as set forth in claim 1, wherein in each mold unit, the base for forming the bottom wall of the tank is provided on the side mold part having the vertical cavity surface for forming the back wall of the tank.

3. Apparatus as set forth in claim 1 wherein each mold unit is provided with a core part which is adapted to be moved in a vertical direction between a position in which the core is located between the side mold parts and a position in which the core part is spaced from each side part.

4. Apparatus as set forth in claim 1, wherein each core part includes an integral cover which closes the top of the mold cavity when the core is positioned between the side mold parts.

5. Apparatus as set forth in claim 1, wherein each mold unit, the base for forming the bottom wall of the tank is provided integrally with the side mold part which is channel-shaped in plan.

6. Apparatus as set forth in claim 1, wherein separate cover part is provided for each mold unit for closing the top of the mold cavity.

7. Apparatus as set forth in claim 1, wherein in each mold unit, a cover part for closing the top of the mold cavity is provided integrally on the side mold part having the vertical cavity surface for forming the back wall of the tank.

8. Apparatus as set forth in any one of claims 1 to 7 wherein in each mold unit, there is provided an aperture in the mold base for draining excess slip from the mold cavity.

9. Apparatus as set forth in claim 1, wherein the facility includes a lifting device mounted so as to be capable of traversing the entire line of mold units, and which is adapted to lift sequentially the core part of each mold unit.

* * * * *